D. E. DUNLAP.
WING CONSTRUCTION FOR AIRPLANES.
APPLICATION FILED APR. 23, 1921.
1,424,996.
Patented Aug. 8, 1922.
4 SHEETS—SHEET 1.
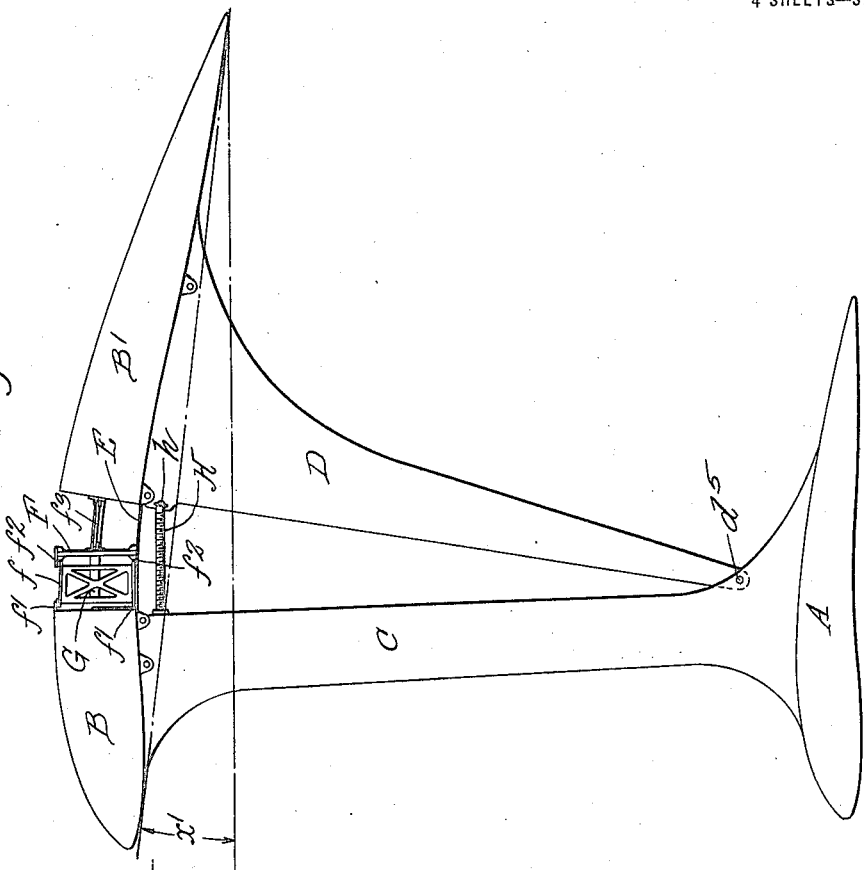
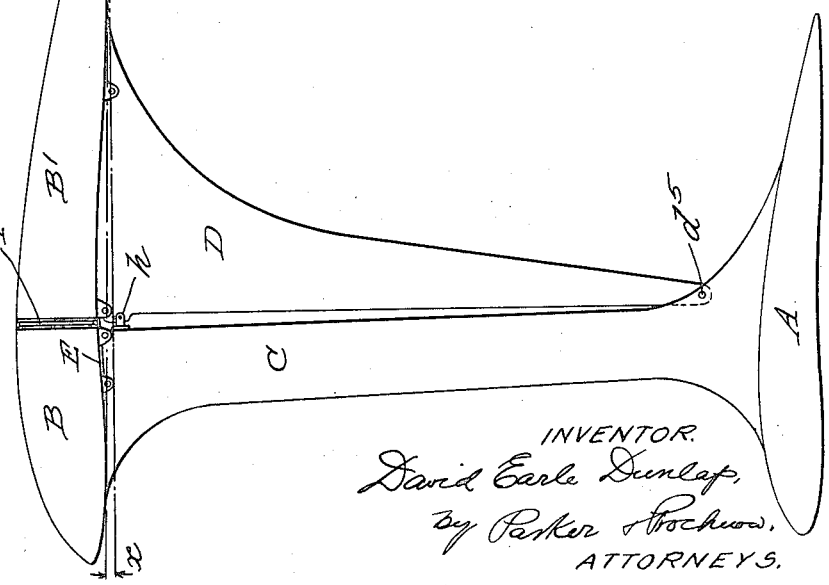
INVENTOR.
David Earle Dunlap,
by Parker & Brockwood.
ATTORNEYS.

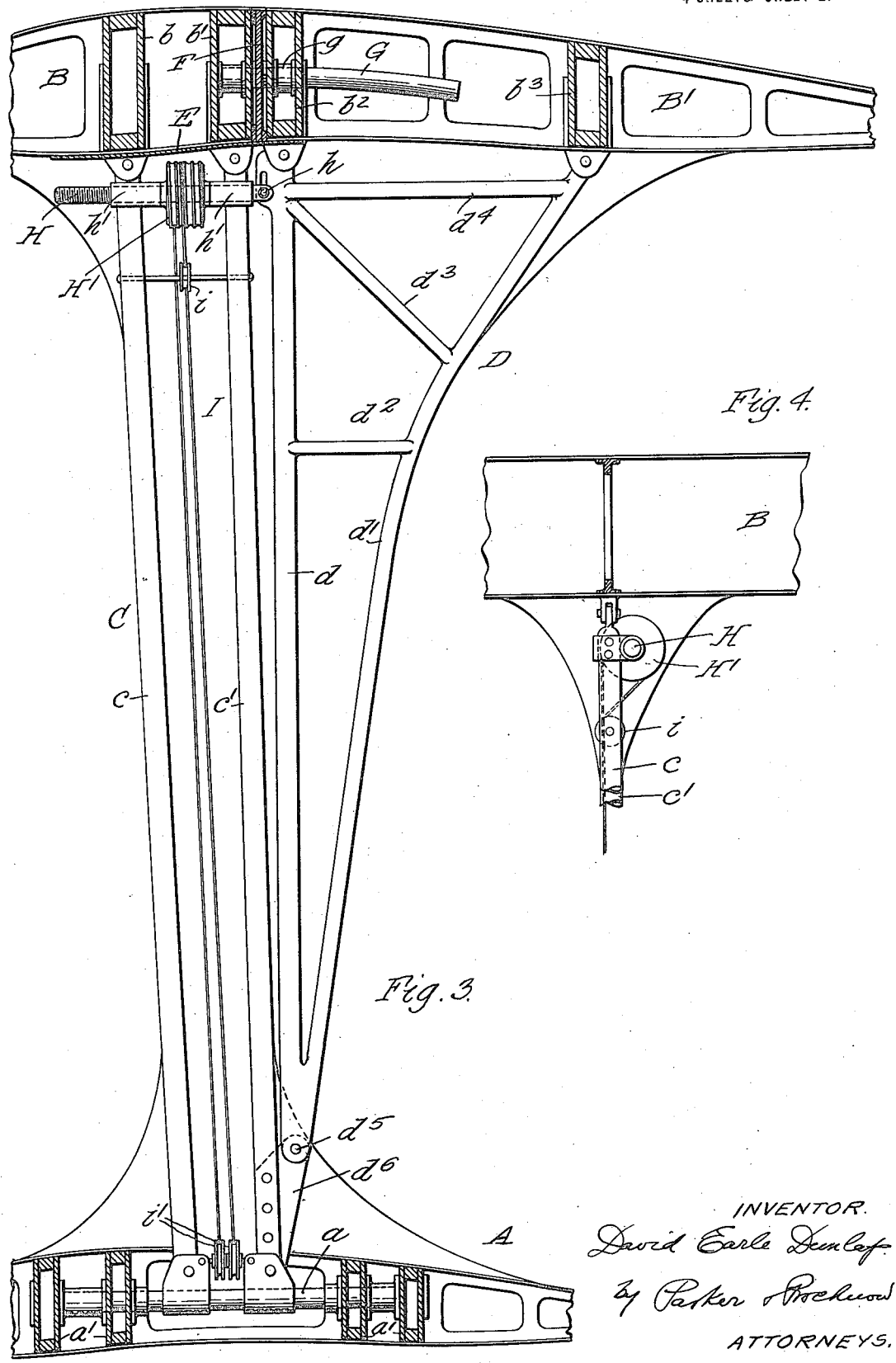

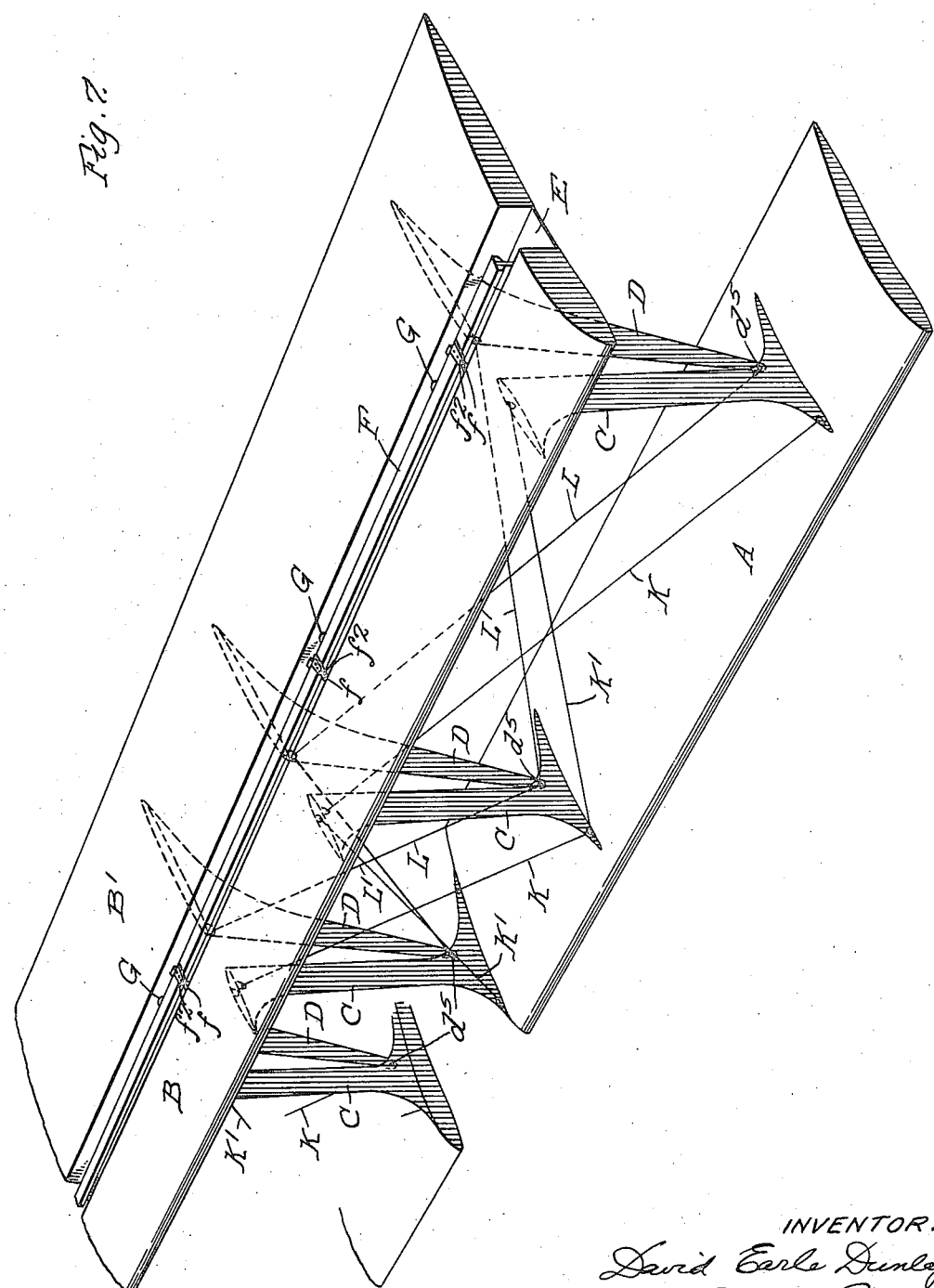

UNITED STATES PATENT OFFICE.

DAVID EARLE DUNLAP, OF BUFFALO, NEW YORK, ASSIGNOR OF THREE-FOURTHS TO ABRAHAM J. ELIAS, OF BUFFALO, NEW YORK.

WING CONSTRUCTION FOR AIRPLANES.

1,424,996. Specification of Letters Patent. Patented Aug. 8, 1922.

Application filed April 23, 1921. Serial No. 463,836.

*To all whom it may concern:*

Be it known that I, DAVID EARLE DUNLAP, a citizen of the United States, residing at Buffalo, in the county of Erie and State of New York, have invented a new and useful Improvement in Wing Constructions for Airplanes, of which the following is a specification.

This invention relates to improvements in the construction of wings or planes for airplanes and the like, and more particularly to improvements in airplane wings which make it possible to increase the speed range of an airplane.

In determining the minimum or landing speed of an airplane one or more of three different factors must be taken into account to wit, the wing area, the camber and the angle of incidence. An increase in any of these three factors produces a decrease in the landing speed of the machine.

The objects of the invention are to provide an airplane wing of improved construction which makes it possible to quickly change the speed range of an airplane; also to provide a wing construction by means of which the wing area, the camber and the angle of incidence can be simultaneously changed; also to so construct the wing that very little force is required to adjust the same for the speed desired; also to provide a wing construction of this kind whereby the strength of the wing is not in any way decreased; also to improve the wing construction of airplanes in other respects hereinafter specified.

In the accompanying drawings:

Fig. 1 is a side elevation of an airplane having a wing construction embodying the invention and showing the parts in the positions which they occupy for flying at high speed.

Fig. 2 is a side elevation thereof showing the parts in the positions which they occupy for flying at a low speed.

Fig. 3 is a fragmentary longitudinal sectional view thereof on an enlarged scale showing the mechanism for moving the two parts of the wing relatively to each other.

Fig. 4 is a fragmentary end view of a part of the adjusting mechanism.

Fig. 7 is a fragmentary perspective view of an airplane provided with a wing embodying the invention and showing the wiring for the wings.

Figure 5:
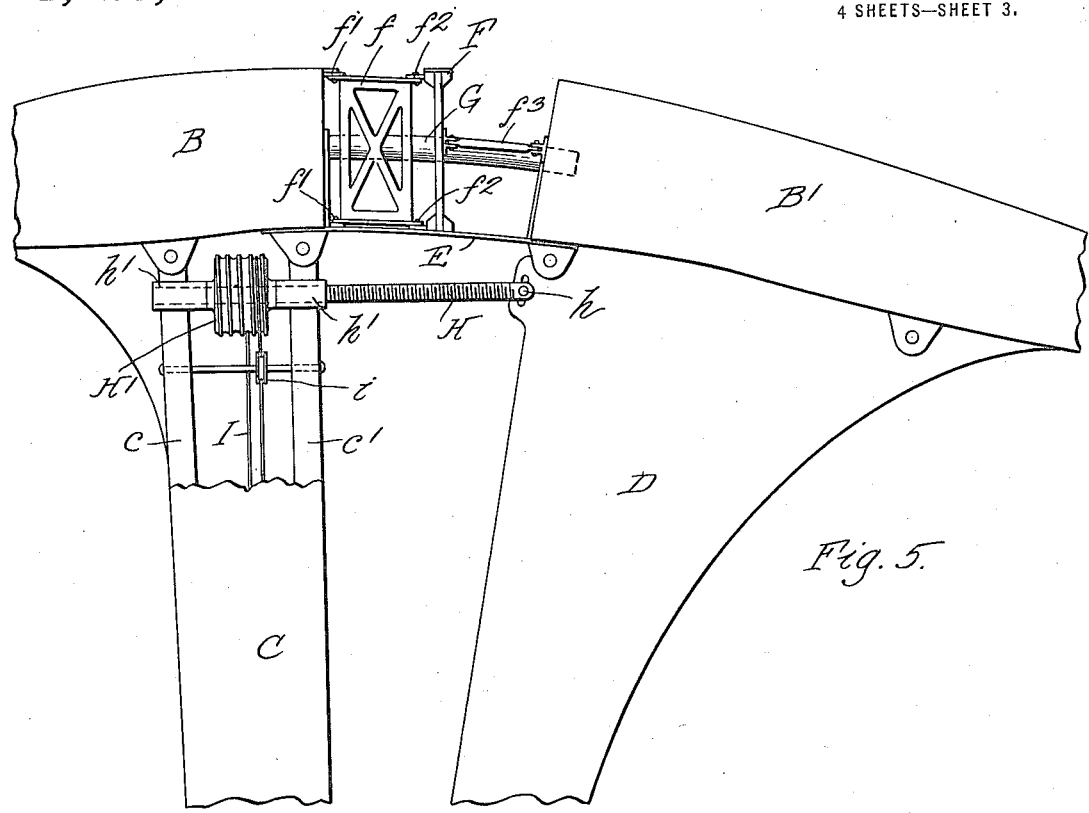
Fig. 5 is a fragmentary side elevation thereof, partly in section, showing the two parts of the wing separated.
Figure 6:
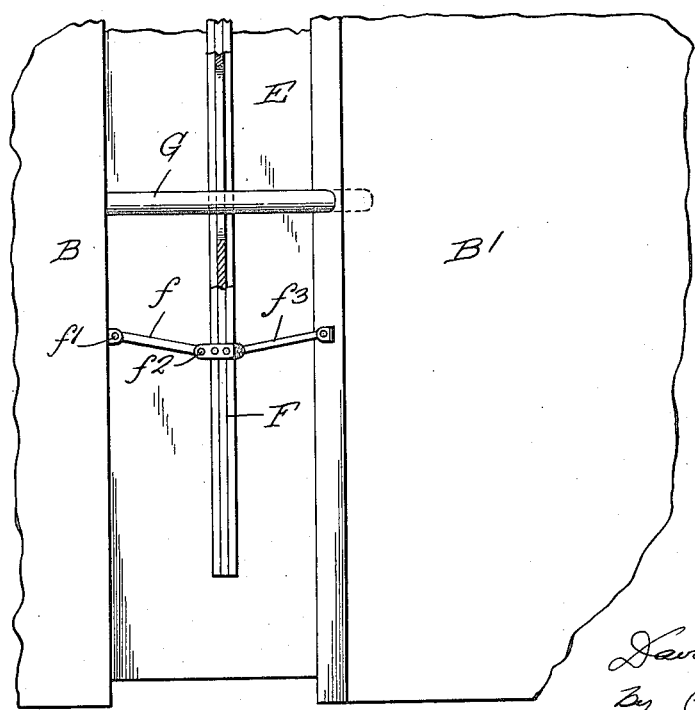
Fig. 6 is a fragmentary top plan view of a wing having the two parts thereof separated.

The airplane shown in the drawings has a wing which is constructed in two parts, a fixed part which in the construction shown forms the front portion of the wing, and a rear part which is movable toward and from the front part. These two parts are normally arranged close together so that one part forms substantially the continuation of the other. When it is desired to decrease the speed of the machine, for example, for landing, the two parts are moved apart, thus increasing the area of the wing as well as increasing the incidence and the camber thereof, and thereby materially decreasing the minimum or landing speed of the airplane. The invention is shown in the accompanying drawings as applied to a biplane, but it will be obvious that the invention is not necessarily limited to this type of airplane but can be used in connection with machines of other types, and more than one wing of a machine may be provided with the improvements embodying my invention.

A represents the lower wing of the airplane shown in the drawings and B and B' represent respectively the front and rear portions of the upper wing, the lower wing being connected with the front part of the upper wing by means of the usual struts C. These struts and the lower wing may be of any usual or suitable construction and the upper wing, except for the fact that it is built in two parts, may also be of any desired construction. As shown in the drawings, each strut has a pair of rods or tubular members $c$ $c'$ which are connected at their lower ends to a tubular member $a$ connecting with a plurality of beams $a'$ extending lengthwise of the lower wing, that is transversely with respect to the airplane. The upper ends of the tubular members $c$ $c'$ are connected to a pair of beams $b$ $b'$ extending lengthwise of the front part of the upper wing. Any other wing and strut structure may be employed if desired.

The rear part B' of the upper wing may be movably mounted on the airplane in any desired manner, the following construction being preferably employed:—

The rear part B' of the upper wing is rigidly secured to a series of struts D, the lower portions of which are pivotally mounted on a part of the airplane. In the construction shown, each of these struts includes a truss-like structure having front and rear rods or tubular members $d\ d'$ connected by suitable brace members $d^2\ d^3\ d^4$. The upper ends of the tubular strut members $d\ d'$ are connected with beams $b^2\ b^3$ extending lengthwise of the movable part B' of the adjustable wing. The lower end of each strut D is pivoted, in the construction shown, at $d^5$ to a strap or bracket $d^6$ secured to the tubular member $c'$ of the corresponding strut C. Any other pivotal connections between the struts D and the airplane may be used. In view of the structure described, it will be seen that the rear part of the upper wing may be moved about the pivots $d^5$ from the position shown in Figs. 1 and 3 to the position shown in Figs. 2–5. $x$, Fig. 1 indicates the angle of incidence when the two parts of the adjustable wing are in a normal position, or close together, and $x'$, Fig. 2 shows the increased angle of incidence when the parts of the adjustable wing are moved apart. The increase in camber when the parts are in the position shown in Fig. 2 will be readily seen.

In order to also increase the area of the adjustable wing when the two parts thereof are separated, means are preferably provided for closing the space between the two parts of the wing when the same are separated. In the construction shown for this purpose, this is accomplished by means of a slidable connecting plate E which may be secured to either of the two parts of the adjustable wing and slidably arranged with reference to the other part. The plate E in the construction shown is secured on the lower front edge of the rear part B' of the adjustable wing and slides relatively to the front part thereof. This plate may be made of any suitable material and by means of this plate the space between the two parts of the adjustable wing is closed when the two parts are separated so that the area of the adjustable wing may be increased by the separation of the parts thereof, in proportion to the extent to which the parts are separated. The upper part of the gap between the parts of the adjustable wing may be closed by a plate corresponding to the plate E, if desired, but the operation of the airplane is not interfered with if this gap is left open at the top.

This plate may be made of material which is sufficiently rigid to withstand the pressure acting upwardly against the same. However, if desired, means may be provided for reinforcing the plate to prevent buckling of the same due to the pressure thereon. By way of illustration, reinforcing means are shown in the accompanying drawings, which include a reinforcing beam F arranged lengthwise of the wing in the space between the two parts of the adjustable wing. This beam is so connected by suitable links to the two parts of the upper wing that the beam will always occupy a position substantially central in the gap between the two parts of the adjustable wing. For this purpose a plurality of braces or truss members $f$ is shown which are pivoted at $f'$ to the front part B of the adjustable wing and at $f^2$ to the beam F. These braces are so formed as to hold the reinforcing beam in engagement with the connecting plate E and to resist the vertical movement of the beam due to pressure acting thereon. The beam is also pivotally connected by means of a plurality of links $f^3$ with the front end of the rear part of the adjustable wing. By means of these links the beams F will always be maintained substantially midway in the gap between the two parts of the wing, and when the two parts are close together the beam and the links will occupy very little space between these two parts. Any other means for reinforcing the plate E may be employed, if desired, or they may be entirely omitted.

Means are preferably provided for preventing the two parts of the adjustable wing from getting out of alinement. For this purpose a plurality of guide members G is employed, which in the construction shown are in the form of tubes, one end of each tube being secured to the beam $b'$ of the stationary part of the adjustable wing. Each tube is slidable through a bearing $g$ arranged in the beam $b^2$ of the movable part of the adjustable wing so that the tubes prevent the parts of the wing from getting out of alinement. Other means for holding the two parts of the adjustable wing in alinement may be provided if desired.

The means for swinging the movable part of the adjustable wing about its pivots may be of any suitable or desired construction. In the particular embodiment of the invention shown in the drawings, the movable part of the wing is swung about its pivots by means of a screw-threaded rod H connected with the movable wing and engaging a nut H' rotatably mounted on the fixed part of the adjustable wing. The threaded rod H in the construction shown has a pin and slot connection $h$ with a part of the strut D and is journalled in bearings $h'$ arranged on the strut C and between which the nut H' is held. Any desired means for turning this nut may be provided, a cable I being provided in the construction shown, which is adapted to engage the peripheral portions of the nut H', and which is guided by means of rollers $i$ $i'$ into operative relation to the operator's seat (not shown). The moving of the cable in one direction or another will actuate the nut to adjust the movable part of the adjustable wing toward or from the fixed part thereof. The cable may be actuated by the aviator in any desired manner and the adjusting mechanism is preferably so proportioned that a relatively short movement of the cable will produce a movement of the movable part B' from one extreme position to the other. It will be noted that comparatively little pull is required on the cable I for the reason that very little resistance is offered to the movement of the part B' in either direction, it being necessary practically only to overcome the skin friction on the area of the movable part, since no part of the movable part of the wing is moved against the air pressure acting on the wing. It will be obvious that any other means for moving the parts of the adjustable wing relatively to each other may be used without departing from my invention.

In Fig. 7, the wiring of the airplane is diagrammatically shown. K K' represent the usual cross wires connecting the upper and lower wings between adjacent struts C. The same system of wiring may be employed in connection with the movable part of the adjustable wing, cross wires L L' being arranged between adjacent struts D. These wires may be connected at their upper ends to any desired portion of the movable part of the adjustable wing or the upper parts of the struts B, and the lower ends of the wires L L' are connected at the pivots $b^5$ about which the struts D, as well as the movable part of the adjustable wing swing. Consequently, the adjustment of the movable part B' does not in any way alter the relation of the wires L L' with reference to the movable part of the adjustable wing.

The adjustable wing described has the advantage of making it possible to change the airplane from a high speed to a low speed machine almost instantaneously. The arrangement of the parts described is such that very little power is required to shift the movable part of the adjustable wing in either direction, and the shifting does not involve the moving of any part against the air pressure acting thereon. A relatively small adjustment of the movable part relatively to the fixed part produces a relatively great variation in speed, since the adjustment is such that all three of the named factors influencing the speed of the airplane are varied, viz, the wing area, the camber and the angle of incidence. The wing adjustment described makes it possible to brace each of the two parts of the adjustable wing so that no strength of the wings is sacrificed by using this construction.

I claim as my invention:

1. An airplane having upper and lower wings, the upper wing being divided in the direction of its length into front and rear parts, struts rigidly connected with said rear part and pivoted adjacent to said lower wing, said rear part being movable about the pivots of said struts toward and from said front part and forming substantially a continuation of said front part when adjacent thereto and forming a gap between said front and rear parts when moved away from said front part, and means connecting said front and rear parts to bridge said gap.

2. An airplane wing divided in the direction of its length into front and rear parts, struts secured at their upper ends to said rear part and pivoted at their lower ends, whereby said rear part in swinging about the pivot of said struts, moves toward and from said front part and forms substantially a continuation of said front part when adjacent thereto and forms a gap between said front and rear parts when moved away from said front part, and a plate secured to the lower face of one of said parts and slidable relatively to said other part and adapted to bridge said gap.

3. In an airplane, a wing consisting of separate front and rear parts adapted to abut when said parts are placed together and to form a gap when separated, struts secured to said front part of the wing and extending downwardly therefrom, and struts connected to said rear part of the wing and having pivotal connections at their lower ends with said airplane, whereby said rear part of the wing may be swung toward and from said front part about said pivots.

4. An airplane having an upper wing provided with a fixed front part and a rear part which is movable toward and from said fixed part, said parts being adapted to abut when placed together and to form a gap when separated, means for bridging said gap, and struts extending downwardly from said movable rear part and having pivotal connections at their lower ends with the airplane, whereby said rear part is adapted to swing about said pivotal connections.

5. An airplane having an upper wing provided with a fixed front part and a rear part which is movable toward and from said fixed part, struts extending downwardly from said movable rear part and having pivotal connections at their lower ends with the airplane, whereby said rear part is adapted to swing about said pivotal conections, and means on said upper wing adapted to close a gap formed when said rear part is moved away from said front part.

6. In an airplane, the combination of a wing having a front part which is fixed relatively to the airplane, and a rear part which is movable relatively to said front part, said parts being adapted to abut when placed together and to form a gap when separated, means for bridging said gap, and struts extending downwardly from said rear part and connecting said rear part with a fixed part on said airplane and guiding the movement of said rear part.

7. An airplane having a lower wing and a wing arranged above said lower wing, and having a front part and a rear part movable toward and from said front part, front struts connecting said front part with said lower wing, rear struts arranged in rear of said front struts and connected to said rear part and extending downwardly therefrom, and a pivotal connection between the lower ends of said rear struts and said front struts, whereby said rear part of the upper wing and said rear struts can move about said pivotal connection.

8. In an airplane, a wing having separable front and rear portions which are provided with abutting edges and are so formed that when the adjacent edges of said two portions are together, the two portions will form a wing of conventional contour, and means for guiding said rear portion substantially about an arc of a circle which slopes downwardly and rearwardly from said front portion, said means including struts pivoted below said rear portion.

9. In an airplane a wing divided along a substantially upright plane extending lengthwise of the wing into front and rear parts, which are adjustable toward and from each other to increase the speed range of the airplane, struts connected to said rear part and pivoted below said rear part, and which resist the strains to which said rear part is subjected, and means connecting said parts and operable to move said parts toward and from each other.

10. In an airplane, a wing divided along a line extending lengthwise of the wing into front and rear parts, which are adjustable toward and from each other to increase the speed range of the airplane, struts connected to said rear part and pivoted below said rear part, and which resist the strains to which said rear part is subjected, and guide means for keeping said parts in alinement, said guide means being secured to one of said parts and having a sliding connection with the other part.

11. In an airplane, a wing divided along a line extending lengthwise of the wing into front and rear parts, which are adjustable toward and from each other to increase the speed range of the airplane, struts connected to said rear part and pivoted below said rear part, and which resist the strains to which said rear part is subjected, guide rods secured to said front part, and guide bearings in said rear part in which said rods are adapted to slide for guiding the movement of said rear parts relatively to said front part.

12. An airplane wing having a relatively fixed front part and a rear part which is movable toward and from said front part, struts connected to said rear part and pivoted below said rear part, and which resist the strains to which said rear part is subjected, and mechanism for adjusting said parts relatively to each other including a movable member connected to one of said parts, and actuating means on said other part for moving said movable member into various positions and holding the same in the various positions.

13. An airplane wing having a relatively fixed front part and a rear part which is movable toward and from said front part, and mechanism for adjusting said parts relatively to each other including an externally threaded member secured to one of said parts and an internally threaded member held on the other part, and means for turning one of said members relatively to the other member to adjust said rear part of said wing relatively to the front part thereof.

14. An airplane wing having a relatively fixed front part and a rear part which is movable toward and from said front part, and mechanism for adjusting said parts relatively to each other including a screw threaded stem secured to one of said parts and a nut engaging said stem and held against endwise movement in the other part of the wing, and means for turning said nut to adjust said rear part of said wing relatively to said front part.

15. An airplane wing having a relatively fixed front part and a rear part which is movable toward and from said front part, and mechanism for adjusting said parts relatively to each other including a screw threaded stem secured to one of said parts and a nut engaging said stem and held against endwise movement in the other part of the wing, and a cable engaging the peripheral parts of said nut and adapted to turn said nut.

16. In an airplane, a wing divided along a line extending lengthwise of the wing into front and rear parts which are adjustable toward and from each other to increase the speed range of the airplane, a plate engaging said parts and adapted to bridge the gap between said parts when said parts are separated, and a beam in said gap which reinforces said plate and which is connected to one of said parts.

17. In an airplane, a wing divided along a line extending lengthwise of the wing into front and rear parts, which are adjustable toward and from each other to increase the speed range of the airplane, a plate engaging said parts and adapted to bridge the gap between said parts when said parts are separated, a reinforcing member engaging the intermediate portions of said plate and arranged in said gap, and truss members connecting said reinforcing member with one of said parts.

18. In an airplane, a wing divided along a line extending lengthwise of the wing into front and rear parts, which are adjustable toward and from each other to increase the speed range of the airplane, a plate engaging said parts and adapted to bridge the gap between said parts when said parts are separated, a reinforcing member engaging the intermediate portions of said plate and arranged in said gap, to occupy a substantially central position therein, movable in said gap, and truss members movably secured to one of said parts and connected with said reinforcing member for holding said reinforcing member in operative relation to said plate.

19. In an airplane, a wing divided along a line extending lengthwise of the wing into front and rear parts, which are adjustable toward and from each other to increase the speed range of the airplane, a plate engaging said parts and adapted to bridge the gap between said parts when said parts are separated, and a beam arranged in said gap and adapted to reinforce said plate, and links pivotally connected with said beam to hold the same in intermediate position in said gap.

20. In an airplane, a wing divided along a line extending lengthwise of the wing into front and rear parts, which are adjustable toward and from each other to increase the speed range of the airplane, a plate engaging said parts and adapted to bridge the gap between said parts when said parts are separated, a beam reinforcing said plate and which is arranged in said gap, truss members pivotally connected to one side of said beam and to one of said parts, and links connecting the other side of said beam with the other of said parts.

DAVID EARLE DUNLAP.